US006840284B2

United States Patent
Schippl et al.

(10) Patent No.: US 6,840,284 B2
(45) Date of Patent: Jan. 11, 2005

(54) FLEXIBLE CONDUIT

(75) Inventors: Klaus Schippl, Hannover (DE); Stephan Lange, Wedemark (DE)

(73) Assignee: Nexans (FR)

( * ) Notice: Subject to any disclaimer, the term of this patent is extended or adjusted under 35 U.S.C. 154(b) by 0 days.

(21) Appl. No.: 10/798,828

(22) Filed: Mar. 10, 2004

(65) Prior Publication Data

US 2004/0216795 A1 Nov. 4, 2004

(30) Foreign Application Priority Data

Apr. 30, 2003 (DE) .......................................... 103 19 387

(51) Int. Cl.$^7$ ................................................. F16L 9/18
(52) U.S. Cl. ....................... 138/113; 138/114; 138/112; 138/148; 62/50.7
(58) Field of Search ...................... 138/112–114, 148, 138/149, 108; 62/50.7

(56) References Cited

U.S. PATENT DOCUMENTS

| 2,875,987 | A | * | 3/1959 | La Valley ..................... 138/38 |
| 3,332,446 | A | * | 7/1967 | Mann ......................... 138/114 |
| 3,383,875 | A | * | 5/1968 | Haas ........................... 62/50.7 |
| 3,473,575 | A | * | 10/1969 | Vogelsang et al. ........... 138/149 |
| 3,490,496 | A | * | 1/1970 | Thornton ..................... 138/112 |
| 3,565,118 | A | * | 2/1971 | Thronton Stearns ........ 138/112 |
| 3,592,238 | A | * | 7/1971 | Scheffler et al. ............. 138/114 |
| 3,706,208 | A | * | 12/1972 | Kadi et al. .................... 62/50.7 |
| 4,036,617 | A |   | 7/1977 | Leonard et al. ................ 62/55 |
| 4,098,476 | A | * | 7/1978 | Jutte et al. ................... 248/694 |
| 4,121,623 | A | * | 10/1978 | Rhone ......................... 138/114 |
| 4,250,927 | A | * | 2/1981 | Newburg ..................... 138/113 |
| 4,259,990 | A | * | 4/1981 | Rohner ....................... 138/113 |
| 4,285,396 | A | * | 8/1981 | Schwoerer et al. .......... 165/162 |
| 4,460,540 | A | * | 7/1984 | Funk et al. .................. 376/327 |
| 4,570,678 | A |   | 2/1986 | Ziemek et al. .............. 138/113 |
| 4,607,665 | A | * | 8/1986 | Williams ..................... 138/148 |
| 6,663,923 | B2 | * | 12/2003 | Futagami et al. ............. 428/34 |

* cited by examiner

*Primary Examiner*—Patrick Brinson
(74) *Attorney, Agent, or Firm*—Sofer & Haroun, LLP

(57) ABSTRACT

A flexible conduit for conveying cryogenic fluids has a metal inner tube and a metal outer tube. A strip-shaped spacer member is made of a material of low thermal conductivity, which is spirally wound on the inner tube such that it contacts both the inner and outer tubes. The strip-shaped spacer member is twisted about its own axis and includes a metal that is stable with respect to high-energy radiation and has a thermal conductivity of less than 25 W/m.K and a tensile strength of more than 240 MPa.

8 Claims, 1 Drawing Sheet

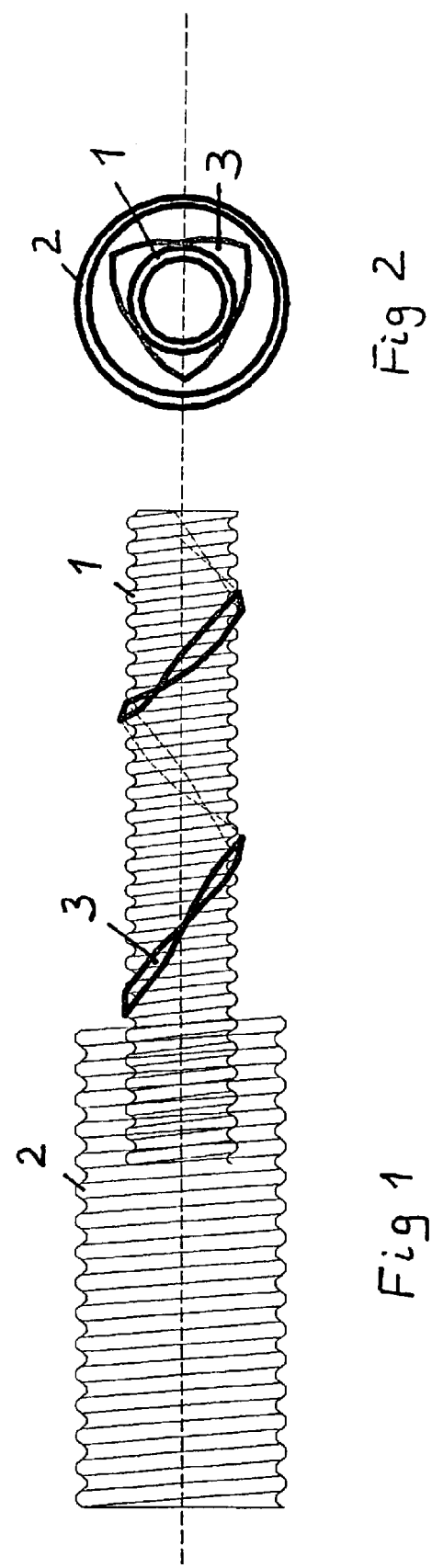

FLEXIBLE CONDUIT

RELATED APPLICATION

This application is related to and claims the benefit of priority from German Patent Application No. 103 19 387.1, filed on Apr. 30, 2003, the entirety of which is incorporated herein by reference.

FIELD OF THE INVENTION

The invention concerns a flexible conduit for conveying cryogenic fluids.

BACKGROUND

U.S. Pat. No. 3,332,446 describes a conduit that consists of a metal inner tube for carrying a cryogenic medium, an outer tube arranged concentrically with respect to the inner tube and spaced some distance from it, and a spacer member. The spacer member is a strip-shaped member, which is spirally wound on the inner tube and contacts both the inner tube and the outer tube over the entire length of the piping. One of the side edges of the spacer member abuts the inner tube, and its side edge that faces outwardly with respect to the inner tube is in contact with the outer tube. The spacer member is composed of a heat insulating plastic material, such as polyethylene.

DE 1 936 609 B2 describes a flexible conduit for conveying cryogenic fluids, which consists of an inner tube, a spacer member spirally wound on the inner tube, a cooling line wound on the spacer member in the opposite winding direction, a metal intermediate sleeve arranged above the cooling line and concentrically with respect to the inner tube, a spacer member spirally wound on the intermediate sleeve, and an outer tube. In addition, a layer of thermal insulation that consists of several layers of metallized plastic foil is provided between the intermediate sleeve and the outer tube.

Previously known conduits cannot be used for conveying cryogenic fluids in the vicinity of, for example, nuclear power plants or radioactive materials, since they contain materials that are not stable over extended periods of time within the radius of action of high-energy radiation.

OBJECT AND SUMMARY

The objective of the present invention is a conduit for cryogenic fluids, which remains fully functional for a period of at least two years, and in which significant losses due to the absorption of heat by the fluid are also avoided over extended periods of time.

The chief advantage of the invention is that, as a result of the twisting of the band-shaped or strip-shaped spacer member, the spacer member rests on the inner and outer tube only in certain places that are spaced some distance apart in the longitudinal direction of the conduit and in those places determines the distance between the tubes. This means that heat conduction from the outer tube to the inner tube occurs only in these places.

Due to the fact that a material is used which is stable with respect to high-energy radiation over an extended period of time, it is necessary to replace the conduits only after a large amount of time has elapsed.

In regard to the choice of the material for the spacer member, an optimization of the values for thermal conductivity was found.

Spacer members produced from titanium sheet or a nickel-base alloy with a chromium content of more than 15% are especially advantageous. Nickel-base alloys for this purpose are commercially available under the trade name Inconel. A nickel-base alloy that has been found to be especially advantageous contains the following components 50–55% nickel 17–21% chromium 2.8–3.3% molybdenum 4.75–5.5% niobium (+tantalum)

as well as small amounts of iron, titanium, carbon, silicon, copper, cobalt, aluminum, manganese, and boron. An alloy of this type is commercially available under the trade name Inconel 718. The thermal conductivity of this alloy is 11.4 W/m.K, and its tensile strength is 1,240 MPa.

Additional advantageous refinements of the invention are specified in the dependent claims.

The invention is explained in greater detail below with reference to specific embodiments, which are shown schematically in FIGS. 1 and 2.

BRIEF DESCRIPTION OF DRAWINGS

FIG. 1 shows a side view of a conduit based on the teaching of the invention, in which the outer tube is shown offset from the inner tube.

FIG. 2 shows a cross section through the conduit in FIG. 1.

DETAILED DESCRIPTION

The conduit in accordance with the teaching of the invention consists of an inner tube 1, which conveys the cryogenic medium, and an outer tube 2, which concentrically surrounds the inner tube 1. Both the inner tube 1 and the outer tube 2 are corrugated metal tubes, preferably made of stainless steel, which are produced by continuous shaping of an almost endless metal strip to form a longitudinally slit tube, welding the longitudinal slit, and corrugating the welded tube.

The distance between the inner tube 1 and outer tube 2 is maintained by a spacer member 3, which consists of a flat metal strip, which is wound on the inner tube 1 and twisted about its own longitudinal axis. The twisting of the spacer member 3 results in the formation of elevations of the spacer member 3 as viewed in the longitudinal direction of the conduit, in which the side edge of the spacer member perpendicularly abuts the inner tube 1 and in this way predetermines the distance of the inner tube 1 from the outer tube 2. To reduce heat losses, it is advantageous for the space between the inner tube 1 and the outer tube 2 to be evacuated.

The flat metal strip 3 that forms the spacer member 3 is optimized with respect to its thermal conductivity and tensile strength.

For example, titanium or a nickel-base alloy that is commercially available under the trade name Inconel 718 is used as the material for the spacer member 3. These materials have thermal conductivities of 22 and 11.4 W/m.K, respectively. The tensile strength of titanium in the annealed state is 230–460 MPa, and that of Inconel 718 is 1,240 MPa. Both materials are also stable for extended periods of time with respect to high-energy radiation, e.g., nuclear radiation, and make it possible to use the conduit in the immediate vicinity of nuclear reactors or for conveying radioactive media.

A typical example of a conduit with corrugated tubes in accordance with the invention has the following dimensions:

| | | |
|---|---|---|
| Inner Tube 1 | $D_o$ | 34 mm |
| | $D_i$ | 30 mm |
| | S | 0.3 mm |
| | Material | 1.4571 (high-grade steel) |
| Outer Tube 2 | $D_o$ | 44 mm |
| | $D_i$ | 39 mm |
| | S | 0.4 mm |
| | Material | 1.4571 (high-grade steel) |
| Spacer Member | Width | 2 mm |
| | Wall thickness | 0.2 mm |
| | Length of lay | 200 mm |
| | Material | titanium |

What is claimed is:

1. Flexible conduit for conveying cryogenic fluids, having a metal inner tube, and a metal outer tube, said flexible conduit comprising:

a strip-shaped spacer member made of a material of low thermal conductivity, which is spirally wound on said inner tube such that said spacer member contacts both said inner tube and said outer tube wherein said strip-shaped spacer member is twisted about its own axis and includes a metal that is stable with respect to high-energy radiation and has a thermal conductivity of less than 25 W/m.K and a tensile strength of more than 240 MPa.

2. Flexible conduit in accordance with claim 1, wherein said spacer member includes titanium sheet.

3. Flexible conduit in accordance with claim 1, wherein said spacer member includes a nickel-base alloy that contains more than 15 wt. % chromium.

4. Flexible conduit in accordance with claim 1, wherein the width of said spacer member is 0.01–0.3 D, where D is the outside diameter of said inner tube.

5. Flexible conduit in accordance with claim 1, wherein the wall thickness of said spacer member is 0.001–0.03 D, where D is the outside diameter of said inner tube.

6. Flexible conduit in accordance with claim 1, wherein the length of lay of the twist is 3–10 D, where D is the outside diameter of said inner tube.

7. Flexible conduit in accordance with claim 1, wherein said inner tube is a corrugated stainless steel tube.

8. Flexible conduit in accordance with claim 1, wherein said outer tube is a corrugated stainless steel tube.

* * * * *